(12) United States Patent
Clark

(10) Patent No.: US 6,374,766 B1
(45) Date of Patent: Apr. 23, 2002

(54) SIGNAL DEVICE FOR ROLL UP DOORS

(76) Inventor: Blair T Clark, 1566 Cameron Crescent Dr. #21C, Reston, VA (US) 20190

(*) Notice: Subject to any disclaimer, the term of this patent is extended or adjusted under 35 U.S.C. 154(b) by 0 days.

(21) Appl. No.: 09/439,990

(22) Filed: Nov. 15, 1999

Related U.S. Application Data

(60) Provisional application No. 60/108,438, filed on Nov. 13, 1998.

(51) Int. Cl.[7] ................................................ B60Q 1/00
(52) U.S. Cl. ..................... 116/28 R; 116/30; 116/209; 116/173; 340/425.5
(58) Field of Search ............................... 116/28 R, 30, 116/35 R, 46, 51, 52, 53, 54, 173, 209; 40/591; 340/425.5

(56) References Cited

U.S. PATENT DOCUMENTS

| | | | |
|---|---|---|---|
| 2,193,747 A | * 3/1940 | Thompson | 116/173 |
| 2,226,159 A | * 12/1940 | Hoffmann | 116/35 R |
| 3,169,739 A | * 2/1965 | Yacobian | 116/173 |
| 3,696,334 A | * 10/1972 | Demeter | 116/173 |
| 3,858,924 A | * 1/1975 | Bores | 116/28 R |
| 3,924,558 A | * 12/1975 | Di Grazia | 116/303 |
| 4,313,264 A | * 2/1982 | Miller, Sr. | 33/264 |
| 4,862,823 A | * 9/1989 | Hughes | 116/209 |
| 4,958,436 A | * 9/1990 | Tusche | 33/264 |
| 5,123,590 A | * 6/1992 | Teele | 116/173 |
| 6,065,423 A | * 5/2000 | Hensel | 116/35 R |

FOREIGN PATENT DOCUMENTS

FR 678765 * 4/1930 ............... 33/264

* cited by examiner

Primary Examiner—Andrew H. Hirshfeld
(74) Attorney, Agent, or Firm—Rodger H. Flagg

(57) ABSTRACT

A safety signal apparatus is secured to the lower side portion of roll up doors on trucks and trailers to provide a visual indication of the position of the roll up door, when viewed by the driver of the vehicle through a side mounted rear view mirror. The safety signal apparatus includes a mounting bracket secured to the lower side portion of a roll up door. A first rod portion is secured to the mounting bracket. A resilient flexible member is secured to the first rod portion. A second rod portion is secured to the opposite end of the resilient flexible member. A signal member is secured to the second rod portion, in visual alignment with a side mounted rear view mirror. The signal member is preferably reflective. The resilient flexible member allows the signal member to bend or flex if struck, and to return to operating position when released. If the roll up door is left open, or is jarred open during transit, the signal member will indicate the position of the roll up door, allowing the driver to stop and secure the roll up door in a closed position. This will avoid a dangerous condition, wherein objects located within the truck or trailer may fall out onto the road, causing a dangerous condition for following drivers, and avoiding damage to objects by falling from the truck or trailer.

20 Claims, 4 Drawing Sheets

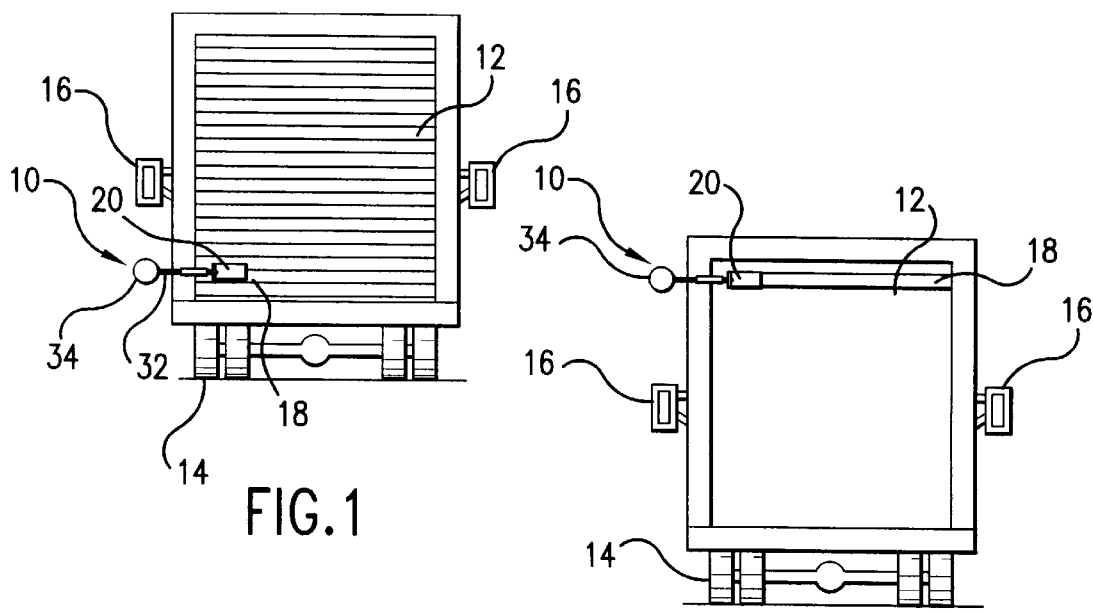
FIG.1
FIG.2
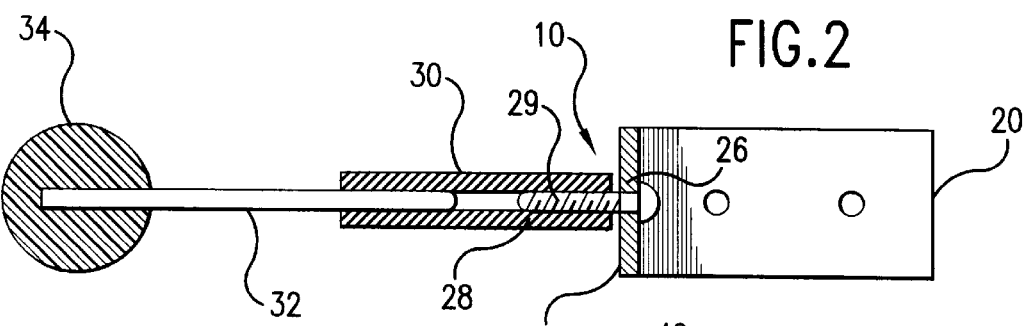
FIG.3
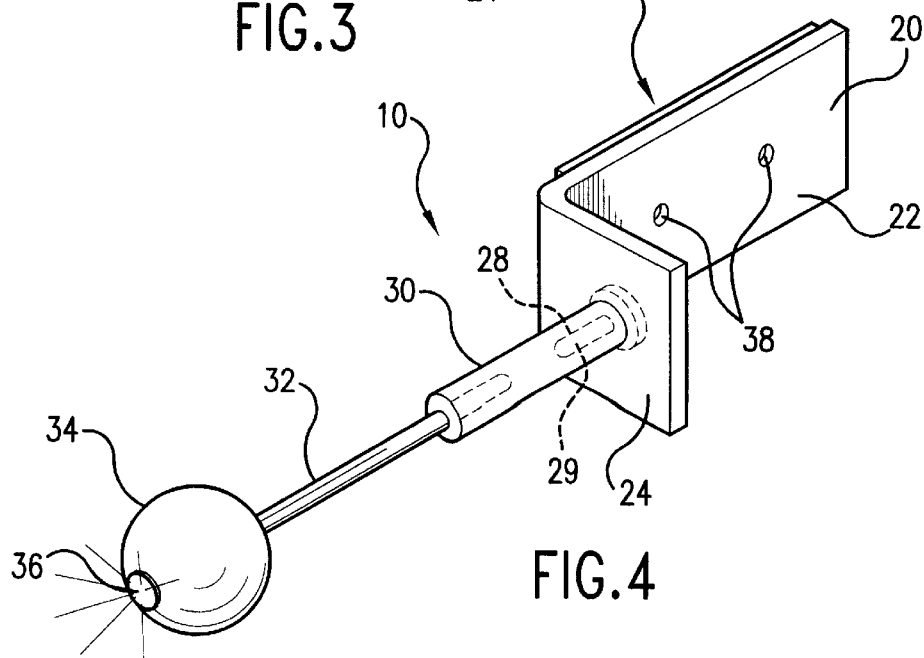
FIG.4

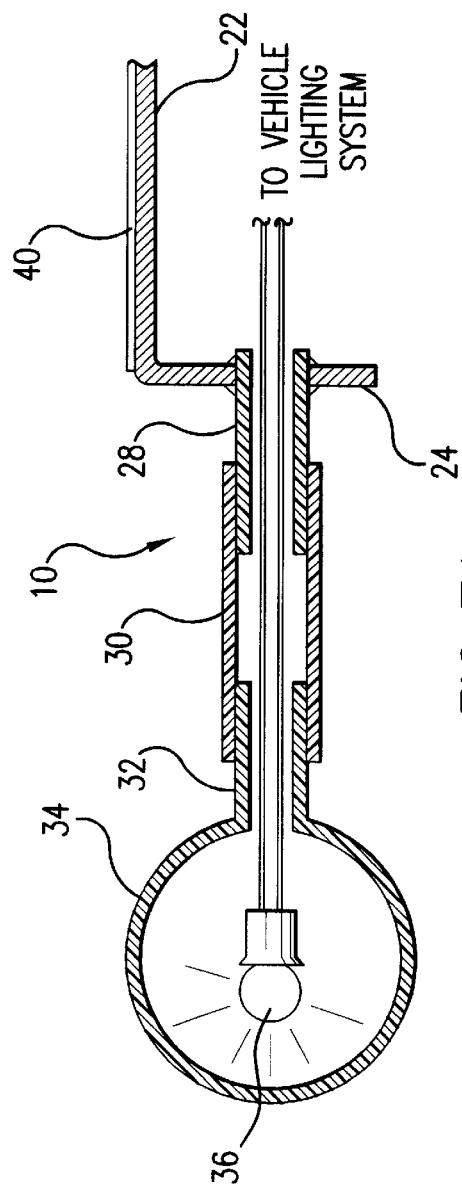
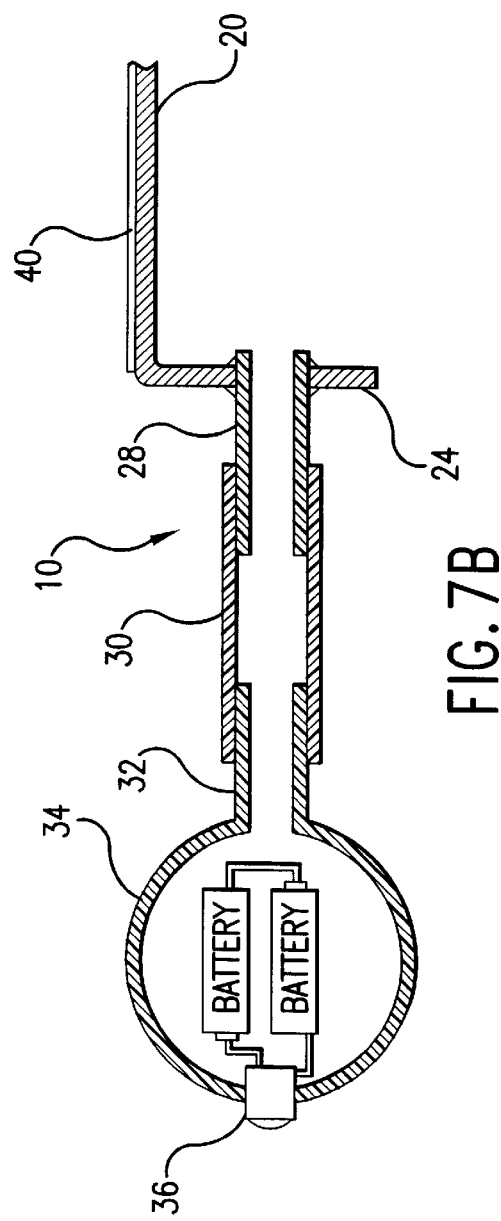
FIG. 7A
FIG. 7B

SIGNAL DEVICE FOR ROLL UP DOORS

This patent application claims priority of Provisional Patent Application 60/108438 filed Nov. 13, 1998, and said provisional patent application is incorporated by reference herein.

1. FIELD OF THE INVENTION

This invention relates to a safety device for trailers having roll up doors, and more specifically, to a signal device to alert the driver when the roll up door rolls up during transit. This invention is inexpensive to make and install, and is adaptable for use on both new and used trucks and trailers having roll up doors.

2. DESCRIPTION OF THE PRIOR ART

Many trucks and towed vehicles have roll up doors. If they are not properly secured during transit, they may raise up, allowing the contents to spill out of the trailer. This causes severe damage to the contents, and poses a serious threat to vehicles following the trailer.

U.S. Pat. No. 5,602,526 issuing to Robert Read on Feb. 11, 1997 discloses a light indicator with sensors to flash when the back door opens during transit.

U.S. Pat. No. 4,864,962 issuing to Robert Kuehl et. al on Sep. 12, 1989 discloses a sideways bolted flag mount which allows a flag to rotate on the pole.

U.S. Pat. No. 4,811,173 issuing to James Johnson on Mar. 7, 1989 discloses the use of mirrors to watch the back door of a trailer.

U.S. Pat. No. 3,924,558 issuing to Di Grazia on Dec. 9, 1975 discloses a back door indicator bar which is visible from the rear view mirror.

U.S. Pat. No. 3,847,497 issuing to Perry Guillory on Nov. 12, 1974 discloses a sideways flag mount.

U.S. Pat. No. 1,727,838 issuing to Yataro Miyaoka on Sept. 10, 1929 discloses an open door indicator flag for use on railway doors.

U.S. Pat. No. 1,582,931 issuing to David Kennedy on May 4, 1926 discloses a spring mounted flag pole for golf courses.

BRIEF SUMMARY OF THE INVENTION

The cited prior art recognizes the need to alert the driver of a truck when the rear door of a truck or trailer is jarred open or left open during transit. This inventor's solution has the advantage of being inexpensive to manufacture, easy to install, discloses the position of the door at all times, and is adapted for use on new or existing vehicles having a roll up rear door, and for towed vehicles having a roll up rear door.

This invention has a mounting bracket for mounting the safety signaling device directly onto the rollup door. The safety signaling device includes a flexible member secured at one end to the mounting bracket, with a signal member mounted on a bar extending from the opposite end of the flexible member. The signal member extends beyond the body of the truck or trailer on the driver's side of the vehicle, so that it is clearly visible in the driver's rear view mirror. The flexible member allows the bar to be biased out of the way in the event an object comes too close to the truck or trailer. The signal member is preferably a flag, light or reflecting member, which is visible in the driver's rear view mirror. When the rear door of the vehicle or trailer raises during transit, the signal member raises with the door, which alerts the driver to the location of the roll up door when in transit.

The purpose and advantages of this invention will be made more apparent when considered in light of the drawings and the following detailed description of the invention.

BRIEF DESCRIPTION OF THE DRAWINGS

FIG. 1 is a rear view of a truck or trailer showing the position of the signal device when the roll up door is in a closed position.

FIG. 2 is a rear view of a truck or trailer showing the position of the signal device when the roll up door is in a raised position.

FIG. 3 is a cross sectional view of the signal device prior to mounting to a roll up door.

FIG. 4 is a perspective view of the mounting bracket, the first rod portion, the flexible member, the second rod portion and the signal member, with a light disposed in the signal member.

FIG. 7A is a cross-sectional view of a lighted signal member, with wires connected to the vehicle lighting system.

FIG. 7B is a cross sectional view of a battery powered lighted signal member.

DETAILED DESCRIPTION OF THE INVENTION

Figure 5:
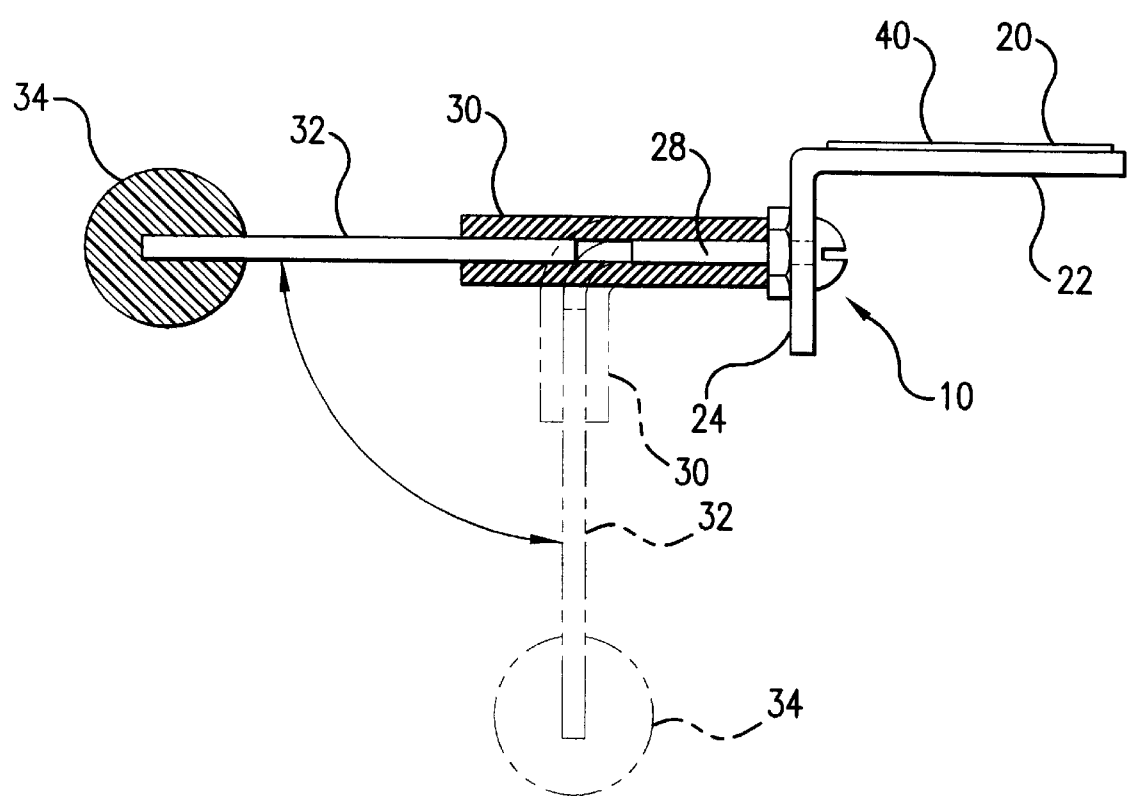
FIG. 5 is a top view of the safety signal apparatus showing the flexible member in a normal position in solid line, and the flexible member in a bendable position shown in dashed line.
Figure 6A:
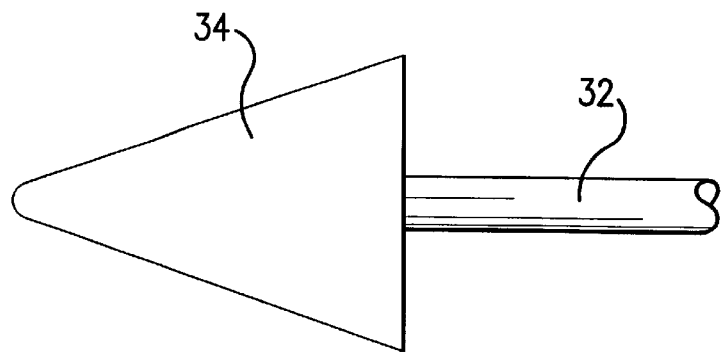
FIG. 6A is a side view of the safety signal apparatus, wherein a conical member is secured to the second rod member, to serve as a signal member.
Figure 6B:
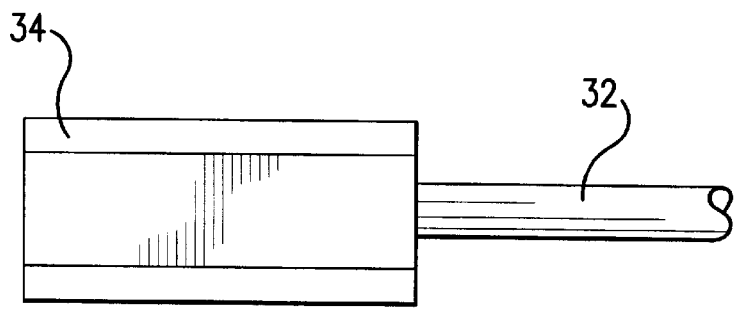
FIG. 6B is a side view of the safety signal apparatus, wherein a multi-sided member is secured to the second rod member, to serve as a signal member.
Figure 6C:
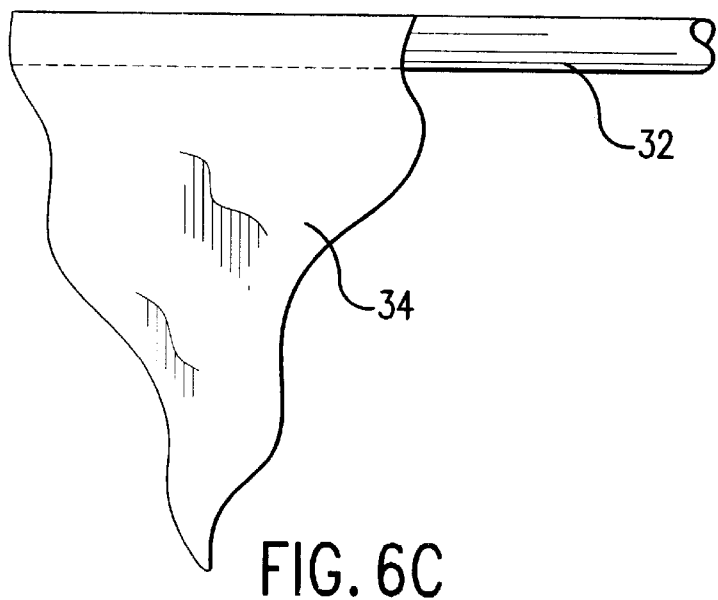
FIG. 6C is a side view of the safety signal apparatus, wherein a flag is secured to the second rod member, to serve as a signal member.

FIG. 1 and FIG. 2 show the safety signal apparatus 10 mounted to a roll up door 12 of a vehicle 14, such as a truck or trailer. A portion of the safety signal apparatus 10 is visible to the driver of the vehicle through a suitably positioned side mounted rear view mirror 16.

The safety signal apparatus 10 is secured to an external, lower side portion 18 of the roll up door 12. A mounting bracket 20 is secured to a new or existing roll up door 12 by any known means, such as by bolting, riveting, screwing, welding, bonding, adhesively securing, etc. Preferably, the mounting bracket is adhesively secured to the roll up door with double sided adhesive tape secured to the mounting bracket as shown in FIG. 4. The mounting bracket 20 may be made of metal or plastic. The mounting bracket 20 may be treated, coated or painted to suit the user, and is preferably corrosion resistant.

The mounting bracket 20 is designed to position the safety signal apparatus 10 in a substantially horizontal position, substantially parallel with the roll up door 12. Preferably, the mounting bracket 20 has a first side portion 22 secured to the rollup door 12, and a second side portion 24 extending at substantially right angles to the first side portion 22. The first side portion 22 of the mounting bracket 20 may be secured to the roll up door 12 by any known means, including providing apertures 38 for receiving bolts, screws or rivets (not shown) therethrough, as well as by securing the first side portion 24 of the mounting bracket with a suitable adhesive, using double sided tape 40, or by brazing or welding the mounting bracket to the roll up door 12.

A suitable aperture 26 is positioned through the second side portion 24 of the mounting bracket 22. Aperture 26 is preferably sized to closely receive a first rod portion 28 therein. The first rod portion 28 may be in the form of a bolt or screw 27 having a head portion 29 at one end of the first rod portion 28. Alternately, the first rod portion 28 may be secured directly to the second side portion 24 of the mounting bracket, eliminating the need for aperture 26.

The first rod portion 28 may be fixedly secured to the second side portion 24 of the mounting bracket 20 by any known means, such as welding, gluing, threading, etc. Alternately, the first rod portion 28 may be restrained by any conventional means within aperture 25 in mounting bracket 20. First rod portion 28 may either be fixedly secured to the second side portion 24, or may be free to rotate within aperture 26, to suit manufacturing and design preference.

The mounting bracket 20 may be formed, cast, molded, or bent depending on the material selected. Where the mounting bracket 20 is made of a plastic material, the first rod portion 28 may be molded as an integral part of the mounting bracket 20.

A resilient, flexible member 30 is adapted to securely engage the first rod portion 28. The flexible member 30 may be in the form of resilient tubing, made of rubber or the like. The flexible member 30 securely engages the first rod portion 28, and extends beyond the first rod portion to securely engage a second rod portion 32. The second rod portion 32 extends substantially horizontally beyond the profile of the side of the vehicle 14. The flexible member 30 is preferably non-conductive, so that contact with an electrically charged element, such as an electrically conductive fence, will not transmit an electrical charge to the vehicle through the roll up door 12.

The flexible member 30 is preferably long enough to position the second rod portion 32 in spaced relation from the first rod portion 28, as best shown in FIG. 3 and FIG. 4. This ensures that the flexible member 30 may be easily biased out of the way in the event contact is made with an external object. See FIG. 5. The flexible member 30 may be sized to accommodate the largest reach required, and trimmed to suit at assembly, to optimize the spacing of the signal member 34 in relation to the side of the vehicle 12.

A second rod portion 32 is secured to the flexible member 30 at the end opposite the first rod member 28. This may be accomplished by gluing, bonding, or forming the second rod portion 32 as an integral part of the flexible member 30. The second rod portion 32 may also be secured to the flexible member 30 by any known means, including staking, pinning, etc.

A signal member 34 is secured to the distal end 36 of the second rod portion 32, at a position which is visible through the side mounted rear view mirror 16 of the vehicle 14. While the safety signal apparatus 10 may be mounted on either the driver's side or the passenger's side of the vehicle 14, it is preferably mounted on the driver's side in proximity to the lower portion of the roll up door 12.

The signal member 34 is preferably a spherical ball having an external reflective surface. The reflective surface is preferably at least partially red, to correspond with the color of lights at the rear of vehicles. Other shapes and sizes of signal member 34 may alternately be used, such as a reflector, light 36 or other visual indication means, which extends beyond the rear corner 18 of the vehicle 14, and is visible to the driver of the vehicle 14 through the vehicle's side mounted rear view mirror 16. Light from the rear vehicle lights is preferably reflected by the signal member 34 for ease of viewing the signal member 34 while driving at night. Alternately, a visual light source 36 may be adapted to be mounted within or adjacent to the signal member. Where a visual light source 36 is used, it may be either battery actuated, or wired into the vehicle's 14 lighting system in any manner well known in the art.

The signal member 34 may also be molded as an integral part of the second rod portion 24. Alternately, the signal member may be solid, or have a hollow core, to suit manufacturing preference. The signal member 34 may also be in the form of a triangle, flag or other desired shape, without departing from the scope of this disclosure, nor from the following claims. However, the signal member 34 is preferably a spherical ball, as it eliminates the need for orientation, and will not pose a risk of scratching or otherwise damaging objects that contact the spherical ball.

The resilient flexible member 30 may be easily trimmed to length during assembly, to adjustably position the signal member 34 in relation to the side of the vehicle. This enables the user to mount the safety signal apparatus 10 to any one of a large variety of vehicles. This is especially useful where it is installed on a fleet of trucks or trailers.

The resilient flexible member 30 enables the second rod portion 32 to bias in the event it comes in contact with an object or obstacle (not shown), such as the side of a building, light pole, fence, another vehicle or a pedestrian. The resilient flexible member 30 will return the second rod portion 28 into alignment with the first rod portion 28, when the obstacle is no longer in direct contact with the signal member 34.

The first and second rod portions 28, 32 may be made of a corrosion resistant material, such as plastic or fiberglass. Alternately the first and second rod portions 28, 32 may be made of metal and treated, coated or painted to suit the user.

Thus, the safety signal apparatus 10 for roll up doors 12, is mounted directly to the roll up door 12, near the lower portion of the driver's side of the roll up door, so that the signal member 34 extends beyond the rear corner of the vehicle. This enables the signal member 32 to be visible to the driver through the side mounted rear view mirror 16 of the vehicle 14.

When the roll up door 12 is in a closed position as shown in FIG. 1, the signal member 32 is visible in proximity above the rear bumper of the vehicle 14. In the event the roll up door 12 raises during transit, as shown in FIG. 2, the signal member 32 also raises, signaling the driver of a dangerous condition, such as loss of the contents of the truck or trailer, and potential danger to following vehicles. If the roll up door 12 is accidentally left in a raised position, the position of the signal member 32 will alert the driver of the position of the roll up door 12.

During transit, the movement of the vehicle, the surface of the road, vibration and centrifugal force all provide stress and other mechanical forces which may cause the roll up door 12 to raise, if not properly secured in the closed position, as shown in FIG. 1.

The present safety signal apparatus 10 for roll up doors 12 may be retrofitted onto existing trucks and trailers. This is especially important for rental vehicles 14, where the drivers are not used to securing roll up doors 12 in a closed position prior to operating the vehicle 14. This invention is also useful to fleet drivers, who routinely transport a variety of trailers, each having a different means to secure a roll up door 12.

This invention is also adaptable to new vehicles 14, including trucks and trailers utilizing roll up doors 12.

When the roll up door 12 is raised as shown in FIG. 2, the safety signal apparatus 10 is free to bend to conform to the space available between the roll up door 12 and the rigid side and top of the vehicle 14. When the roll up door 12 is raised, the second rod portion 32 is biased first backwards, then downwards. This multidirectional flexing is made possible by the flexible member 30, which is free to articulate in any direction.

Various changes in the details and materials described herein, may be made by those skilled in this art, and such variations and adaptations are intended to fall within the scope of this disclosure, and the following claims. Therefore, while the present invention has been shown herein in what is believed to be the most practical and preferred embodiment, it is recognized that departures can be made therefrom within the scope of this invention, which is therefore not to be limited to the details disclosed herein, but is to be accorded the full scope of the description so as to embrace any and all equivalent embodiments.

PARTS LIST

10—Safety signal apparatus
12—roll up door
14—vehicle
16—side mounted roll up mirror
18—lower side portion of roll up door
20—mounting bracket
22—first side portion
24—second side portion
26—aperture
28—first rod portion
29—threaded rod
30—flexible member
32—second rod portion
34—signal member
36—light source
38—mounting apertures
40—double sided tape

I claim:

1. A safety signal device secured to a vehicle with a roll-up door, which comprises:
    a) a mounting bracket for securement to a lower side portion of said vehicle roll-up door, said mounting bracket having a first side portion secured to said vehicle roll-up door, and a second side portion extending substantially at right angles to the first side portion;
    b) a first, substantially rigid rod portion rigidly secured substantially horizontally to the second side portion of the mounting bracket;
    c) a resilient, flexible non-conductive, tubular member secured at a first end to the first rod portion extending from the second side portion of the mounting bracket;
    d) a second, substantially rigid rod portion secured to a second end of the flexible member in spaced relation from the first rod portion, the second rod portion extending beyond said vehicle roll-up door in visual range of a driver through a rear view mirror of said vehicle; and
    e) a signal member secured to a distal end of said second rod portion,
    wherein the resilient, flexible non-conductive member flexes as the roll-up door is fully raised, which positions the signal member out of sight of the vehicle's rear view mirror between the roll-up door and an inner wall of the vehicle.

2. The safety signal device of claim 1, wherein the first side portion of the mounting bracket is adhesively secured to the lower side portion of said vehicle roll-up door with double sided tape.

3. The safety signal device of claim 1, wherein the first rod portion is closely received through an aperture extending through the second side portion of the mounting bracket.

4. The safety signal device of claim 1, wherein the resilient, flexible member is a non-conductive tubular member having an inner diameter sized to tightly receive the first rod portion in the inner diameter of the first end and to tightly receive the second rod portion in the inner diameter of the second end in spaced relation from the first rod portion.

5. The safety signal device of claim 1, wherein the signal member is adhesively secured to the second rod portion.

6. The safety signal device of claim 1, wherein the first rod and the second rod are tubular rods, and electrical wiring from the vehicle is routed through the first and second tubular rods to the signal member, and the signal member is light transmissive, to selectively actuate a light located within the signal member and to provide a lighted signal member for use at night.

7. The safety signal device of claim 1 wherein a light is disposed in the signal member, and the light is battery powered.

8. The safety signal device of claim 1, wherein the signal member is externally coated with a reflective surface.

9. The safety signal device of claim 1, wherein the second rod portion and the signal member are molded together as a single integral part.

10. The safety signal device of claim 1, wherein the signal member is selected to be one of: a spherical ball, a conical member, a multi-sided member, and a flag.

11. A safety signal device secured to a vehicle having a roll-up door, which comprises:
    a) a mounting bracket for securement to a lower side portion of said vehicle roll-up door, said mounting bracket having a first side portion secured to said vehicle roll-up door, and a second side portion extending substantially at right angles to the first side portion;
    b) a first, substantially horizontally disposed, rigid rod portion secured to the second side portion of the mounting bracket;
    c) a resilient, non-conductive flexible tubular member secured at a first end to the first rod portion extending from the second side portion of the mounting bracket;
    d) a second, substantially rigid rod portion secured to a second end of the flexible member in spaced relation from the first rod portion, the second rod portion extending beyond said vehicle roll-up door in visual range of a driver of said vehicle, the second rod portion having a substantially hollow signal member disposed on the distal end of the second rod portion said, tubular member configured to flex to permit said signal device to be positioned between the roll-up door and an inner wall of the vehicle upon said roll-up door being fully raised.

12. The safety signal device of claim 11, wherein the first side portion of the mounting bracket is adhesively secured to the lower side portion of said vehicle roll-up door.

13. The safety signal device of claim 11, wherein the first end of the resilient, flexible non-conductive member is adhesively secured to the first rod portion and the second end portion of the flexible member is adhesively secured to the second rod portion.

14. The safety signal device of claim 11, wherein the first rod and the second rod are each tubular rods, and electrical wiring from a vehicle lighting system is routed through the first and second tubular rods and through the flexible non-conductive tubular member to the substantially hollow light member to selectively actuate a light located within the substantially hollow signal member for increased visibility at night said signal member being substantially light transmissive.

15. The safety signal device of claim 11, wherein a battery powered light is disposed within the light transmissive signal member, and said light is actuated independently of the vehicle lighting system for improved visibility in low light conditions.

16. The safety signal device of claim 11, wherein the signal member is externally coated with a reflective surface.

17. The safety signal device of claim 11, wherein the signal member is selected to be one of: a spherical ball, a conical member, a multi-sided member, and a flag.

18. A safety signal device secured to a vehicle having a roll-up door, which comprises:

a) a mounting bracket for securement to a lower side portion of said vehicle roll-up door, said mounting bracket having a first side portion adhesively secured to said vehicle roll-up door, and a second side portion extending substantially at right angles to the first side portion;

b) a first, substantially horizontally disposed, rigid rod portion secured to the second side portion of the mounting bracket;

c) a resilient, flexible non-conductive tubular member having a first end and a second end, the first end secured to the first rod portion, said resilient, flexible non-conductive tubular member is cut to size at assembly to optimize the position of a signal member in relation to the side of the vehicle; and d) a second, substantially rigid rod portion secured to a second end of the flexible member in spaced relation from the first rod portion, the second rod portion extending beyond said vehicle roll-up door in visual range of a driver of said vehicle, the second rod portion having a signal member disposed on the distal end of the second rod portion, the signal member selected from one of the following: a spherical ball, a conical member, a multi-sided member, and a flag, said tubular member configured to flex to permit said signal device to be positioned between the roll-up door and an inner wall of the vehicle upon said roll-up door being fully raised.

19. The safety signal device of claim 18, wherein a light is disposed in the signal member, and the light is selectively actuated to improve visual recognition of the location of the safety signal device in low light conditions.

20. The safety signal device of claim 18, wherein the signal member is externally coated with a reflective surface.

* * * * *